(12) United States Patent
Alvanos et al.

(10) Patent No.: US 8,834,125 B2
(45) Date of Patent: Sep. 16, 2014

(54) HYBRID ROTOR DISK ASSEMBLY WITH A CERAMIC MATRIX COMPOSITE AIRFOIL FOR A GAS TURBINE ENGINE

(75) Inventors: Ioannis Alvanos, West Springfield, MA (US); Gabriel L. Suciu, Glastonbury, CT (US); Christopher M. Dye, Glastonbury, CT (US); Glenn Levasseur, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 467 days.

(21) Appl. No.: 13/116,188

(22) Filed: May 26, 2011

(65) Prior Publication Data
US 2012/0301314 A1   Nov. 29, 2012

(51) Int. Cl.
*F01D 5/30* (2006.01)
*F01D 5/28* (2006.01)
*F01D 5/22* (2006.01)
*C04B 37/00* (2006.01)

(52) U.S. Cl.
CPC ....... *F01D 5/3046* (2013.01); *C04B 2235/5244* (2013.01); *F01D 5/282* (2013.01); *C04B 2237/365* (2013.01); *C04B 2237/76* (2013.01); *F05D 2300/6033* (2013.01); *F01D 5/284* (2013.01); *F01D 5/225* (2013.01); *C04B 37/00* (2013.01); *C04B 2237/38* (2013.01); *F05D 2240/12* (2013.01)
USPC .................................................... 416/220 R

(58) Field of Classification Search
USPC .......... 416/193 A, 204 R, 214 A, 214 R, 215, 416/217, 218, 219 R, 222, 248, 220 R
See application file for complete search history.

(56) References Cited

U.S. PATENT DOCUMENTS

| | | | |
|---|---|---|---|
| 3,057,767 A | 10/1962 | Kaplan | |
| 3,487,879 A * | 1/1970 | McCarthy et al. | ........ 416/220 R |
| 3,694,104 A * | 9/1972 | Erwin | ............................ 416/217 |
| 3,801,222 A | 4/1974 | Violette | |
| 4,400,915 A * | 8/1983 | Arrigoni | ........................ 451/365 |
| 5,017,092 A | 5/1991 | Violette et al. | |
| 5,163,817 A | 11/1992 | Violette et al. | |
| 5,240,377 A * | 8/1993 | Farr | ........................... 416/229 R |
| 5,580,219 A * | 12/1996 | Frey et al. | ...................... 416/217 |
| 6,213,719 B1 | 4/2001 | Violette et al. | |
| 6,422,820 B1 | 7/2002 | Anderson et al. | |
| 6,447,250 B1 | 9/2002 | Corrigan et al. | |
| 6,457,942 B1 * | 10/2002 | Forrester | ................... 416/220 R |
| 6,481,971 B1 | 11/2002 | Forrester | |
| 7,094,021 B2 | 8/2006 | Haubert | |
| 7,104,758 B2 | 9/2006 | Brock et al. | |
| 7,284,958 B2 | 10/2007 | Dundas | |
| 7,377,749 B2 | 5/2008 | Charrier et al. | |
| 7,393,182 B2 | 7/2008 | Matheny | |
| 7,762,781 B1 | 7/2010 | Brown et al. | |
| 7,976,281 B2 | 7/2011 | Keith et al. | |
| 2007/0082201 A1* | 4/2007 | Subramanian et al. | ....... 428/408 |
| 2009/0004018 A1 | 1/2009 | Dejaune | |
| 2010/0172760 A1 | 7/2010 | Ammann | |

* cited by examiner

*Primary Examiner* — Edward Look
*Assistant Examiner* — Eldon Brockman
(74) *Attorney, Agent, or Firm* — Carlson, Gaskey & Olds, P.C.

(57) ABSTRACT

A Ceramic Matrix Composite (CMC) airfoil for a gas turbine engine includes a CMC root section which extends to form a CMC airfoil section, the CMC root section defines a bore along a non-linear axis.

22 Claims, 14 Drawing Sheets

HYBRID ROTOR DISK ASSEMBLY WITH A CERAMIC MATRIX COMPOSITE AIRFOIL FOR A GAS TURBINE ENGINE

BACKGROUND

The present disclosure relates to a gas turbine engine, and more particularly to Ceramic Matrix Composites (CMC) components therefor.

The turbine section of a gas turbine engine operates at elevated temperatures in a strenuous, oxidizing type of gas flow environment and is typically manufactured of high temperature superalloys. Turbine rotor modules often include a multiple of rotor disks that may be fastened together by bolts, tie rods and other structures. Each of the rotor disks includes a multiple of shrouded blades which are typically retained through a firtree slot arrangement. This approach works well with metal alloys, but may be a challenge when the rotor disk is manufactured of a ceramic matrix composite (CMC) material.

SUMMARY

A Ceramic Matrix Composite (CMC) airfoil for a gas turbine engine according to an exemplary aspect of the present disclosure includes a CMC root section which extends to form a CMC airfoil section, the CMC root section defines a bore along a non-linear axis.

A Ceramic Matrix Composite (CMC) airfoil for a gas turbine engine according to an exemplary aspect of the present disclosure includes a CMC root section which defines a bore, said bore formed from a first multiple of CMC plies which define a tube. A second multiple of CMC plies extend at least partially around the tube to at least partially define a CMC airfoil section.

A rotor disk assembly for a gas turbine engine according to an exemplary aspect of the present disclosure includes a hub defined about an axis of rotation. The hub has a first radial flange with a multiple of first apertures and a second radial flange with a multiple of second apertures. A multiple of CMC airfoils each having a CMC root section that defines a bore defined about a non-linear axis, the CMC root section located between the first radial flange and the second radial flange such that the bore is aligned with one of the multiple of first apertures and one of the multiple of second apertures to receive an airfoil pin.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
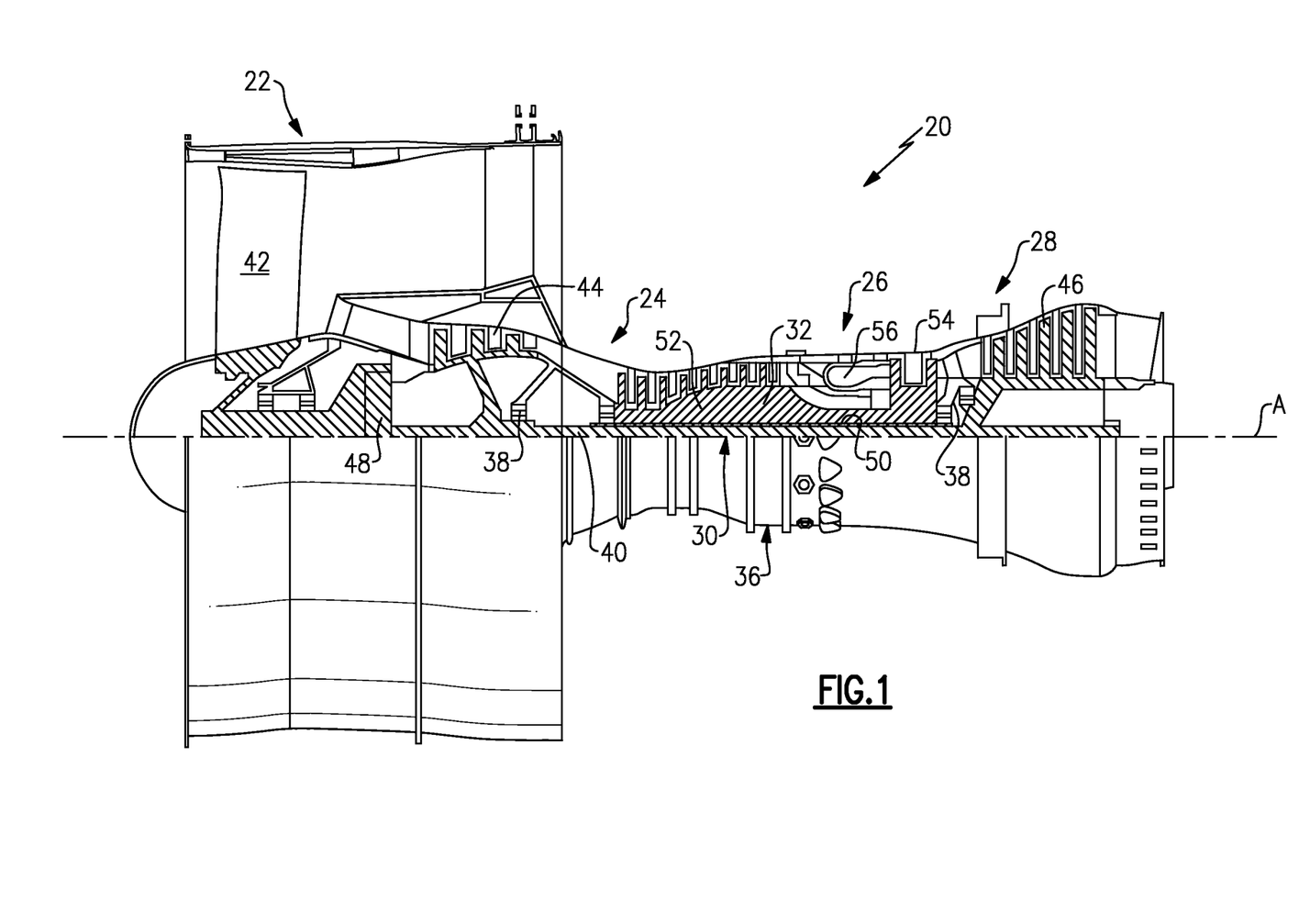
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed with fuel and burned in the combustor 56, then expanded over the high pressure turbine 54 and low pressure turbine 46. The turbines 54, 46 rotationally drive the respective low speed spool 30 and high speed spool 32 in response to the expansion.

Figure 2:
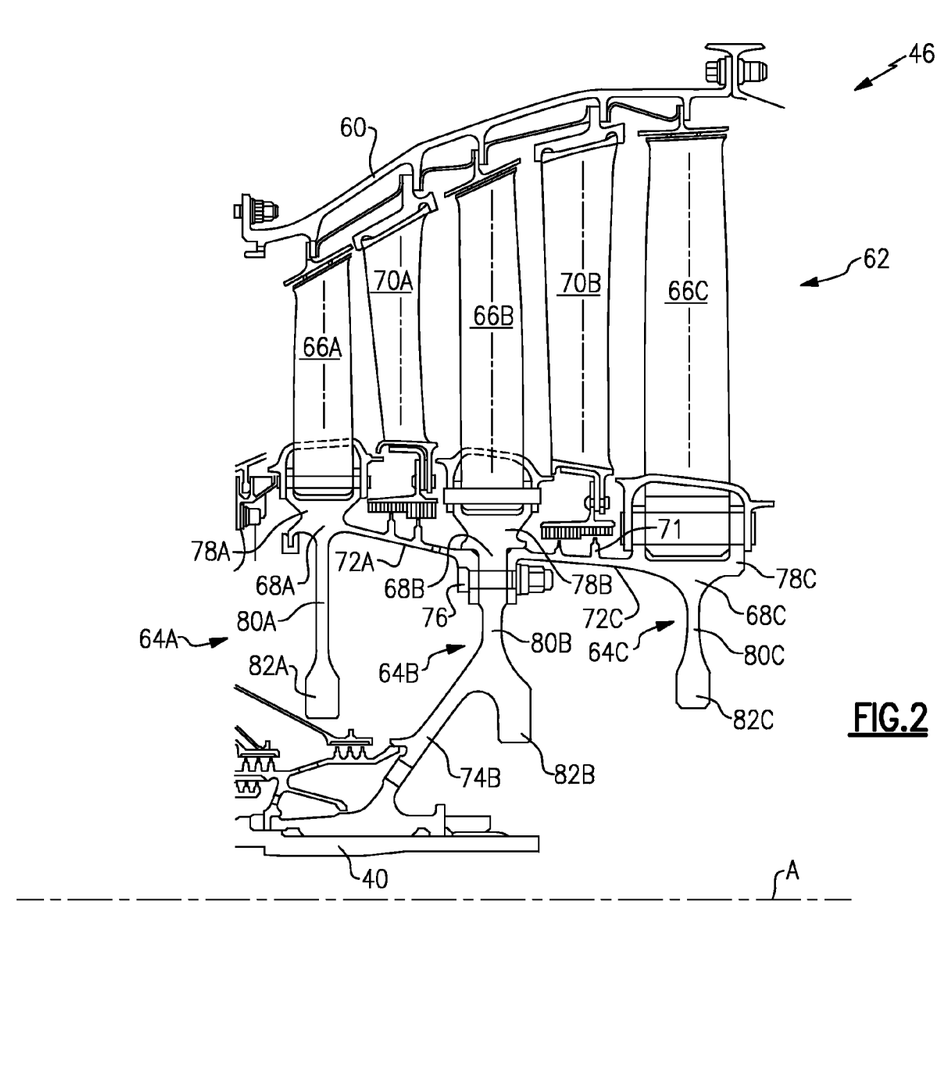
FIG. 2 is an enlarged sectional view of a LPT section of the gas turbine engine with a hybrid CMC LPT disk assembly.

With reference to FIG. 2, the low pressure turbine 46 generally includes a low pressure turbine case 60 with a multiple of low pressure turbine stages. In the disclosed non-limiting embodiment, the low pressure turbine case 60 is manufactured of a ceramic matrix composite (CMC) material or metal alloy. It should be understood that examples of CMC material for all componentry discussed herein may include, but are not limited to, for example, S200 and SiC/SiC. It should be also understood that examples of metal superalloy for all componentry discussed herein may include, but are not limited to, for example, INCO 718 and Waspaloy. Although depicted as a low pressure turbine in the disclosed embodiment, it should be understood that the concepts described herein are not limited to use with low pressure turbine as the teachings may be applied to other sections such as high pressure turbine, high pressure compressor, low pressure compressor and intermediate pressure compressor and intermediate pressure turbine of a three-spool architecture gas turbine engine.

A low pressure turbine (LPT) rotor module 62 includes a multiple (three shown) of CMC disk assemblies 64A, 64B, 64C. Each of the CMC disk assemblies 64A, 64B, 64C include a row of airfoils 66A, 66B, 66C which extend from a respective hub 68A, 68B, 68C. The rows of airfoils 66A, 66B, 66C are interspersed with CMC vane structures 70A, 70B to form a respective number of LPT stages. It should be understood that any number of stages may be provided.

The CMC disk assemblies 64A, 64C include arms 72A, 72C which extend from the respective hub 68A, 68C. The arms 72A, 72C trap a mount 74B which extends from hub 68B. A multiple of fasteners 76 (only one shown) mount the arms 72A, 72C to the mount 74B to assemble the CMC disk assemblies 64A, 64B, 64C and form the LPT rotor module 62. The radially inwardly extending mount 74B collectively attaches the LPT rotor module 62 to the inner shaft 40. The arms 72A, 72C may also include seals such as knife edge seals 71 which interface with the CMC vane structures 70A, 70B.

Each hub 68A, 68B, 68C further includes a bore geometrically that generally includes a blade mount section 78A, 78B, 78C, a relatively thin disk section 80A, 80B, 80C that extends radially inward from the respective blade mount section 78A, 78B, 78C then flares axially outward to define a bore section 82A, 82B, 82C. In the disclosed non-limiting embodiment, the hub 68A, 68B, 68C may be manufactured of CMC materials, such as S200 and SiC/SiC, or metal alloy materials and others to provide a hybrid rotor disk assembly.

The bore 82A, 82B, 82C facilitates the balance of hoop stresses by minimizing free ring growth and to counter moments which cause airfoil roll that may otherwise increase stresses. That is, bore 82A, 82B, 82C is designed to counter balance the load related to the respective rows of airfoils 66A, 66B, 66C and appendages such as the hub 72A, 72C. Placement of appendages such as the hub 72A, 72C is typically placed in the self sustaining radius. The self sustaining radius is defined herein as the radius where the radial growth of the disk equals the radial growth of a free spinning ring. Mass radially inboard of the self sustaining radius is load carrying and mass radially outboard of the self-sustaining radius is not load carrying and can not support itself. Aside from the desire to balance the respective rows of airfoils 66A, 66B, 66C, the relatively thin disk sections 80A, 80B, 80C and the bore sections 82A, 82B, 82C may otherwise be of various forms and geometries.

It should be understood that although rotor disk assembly 64C will be described in detail herein as the hybrid rotor disk assembly, such description may also be applicable to CMC disk assemblies 64A, 64B as well as additional or other stages. The LPT rotor module 62 may include only one or any number of hybrid CMC disk assemblies such as disk assembly 64C combined with other disk constructions. It should also be understood that other rotor modules will also benefit herefrom.

Figure 3:
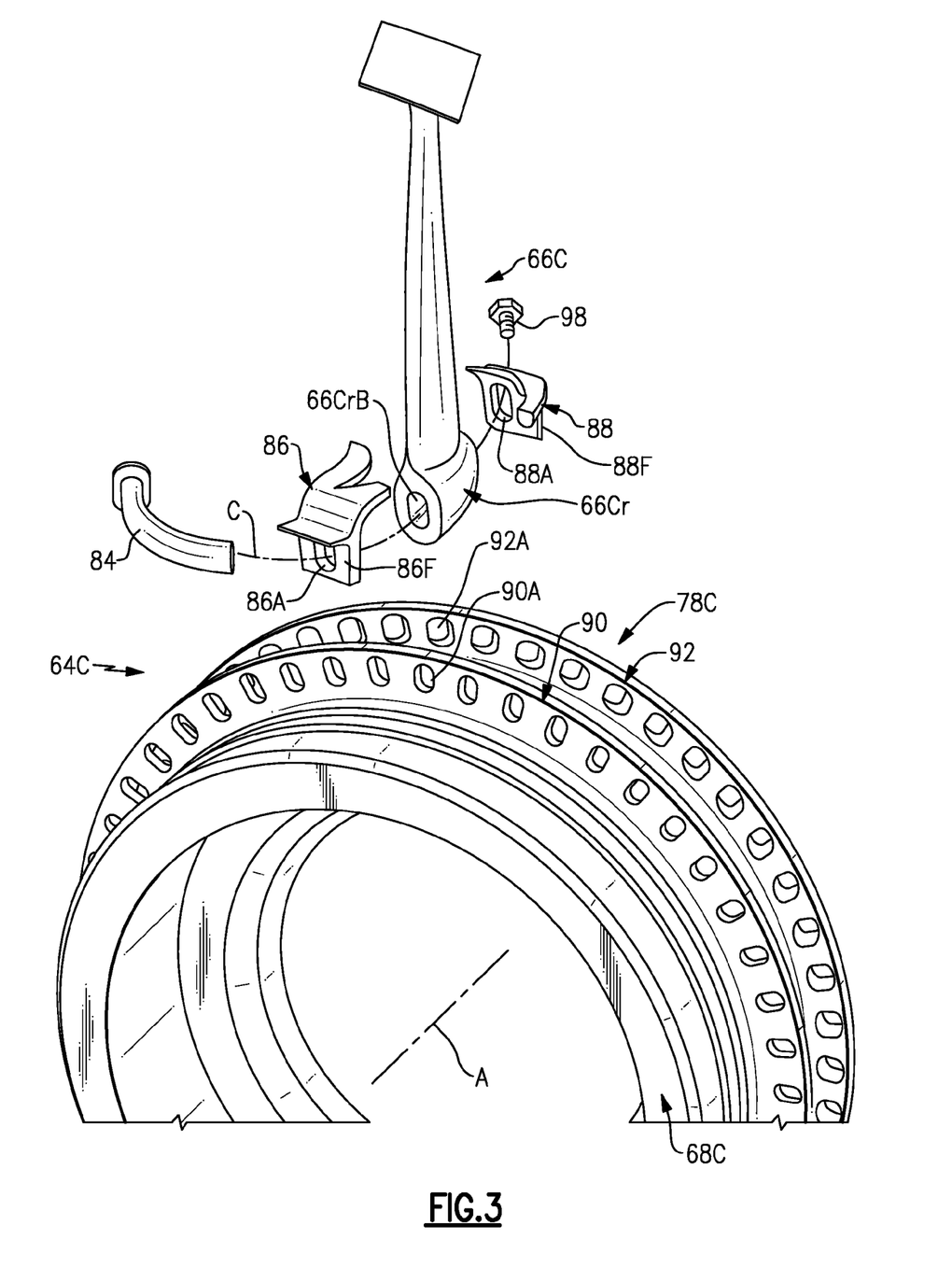
FIG. 3 is an exploded view of a hybrid CMC disk assembly.

With reference to FIG. 3, the CMC disk assembly 64C generally includes the hub 68C, a multiple of airfoils 66C with a respective airfoil pin 84 (only one of each shown), a forward platform segment 86 and an aft platform segment 88. A hybrid combination of materials may be utilized within the disk assembly 64C. In the disclosed non-limiting embodiment, the hub 68C may be manufactured of INCO718, Waspaloy, or other metal alloy, the airfoils 66C and the platform segments 86, 88 may be manufactured of a CMC material and the airfoil pin 84 may be manufactured of a Waspaloy material. It should be understood that various other materials and combinations thereof may alternatively be utilized.

Figure 4:
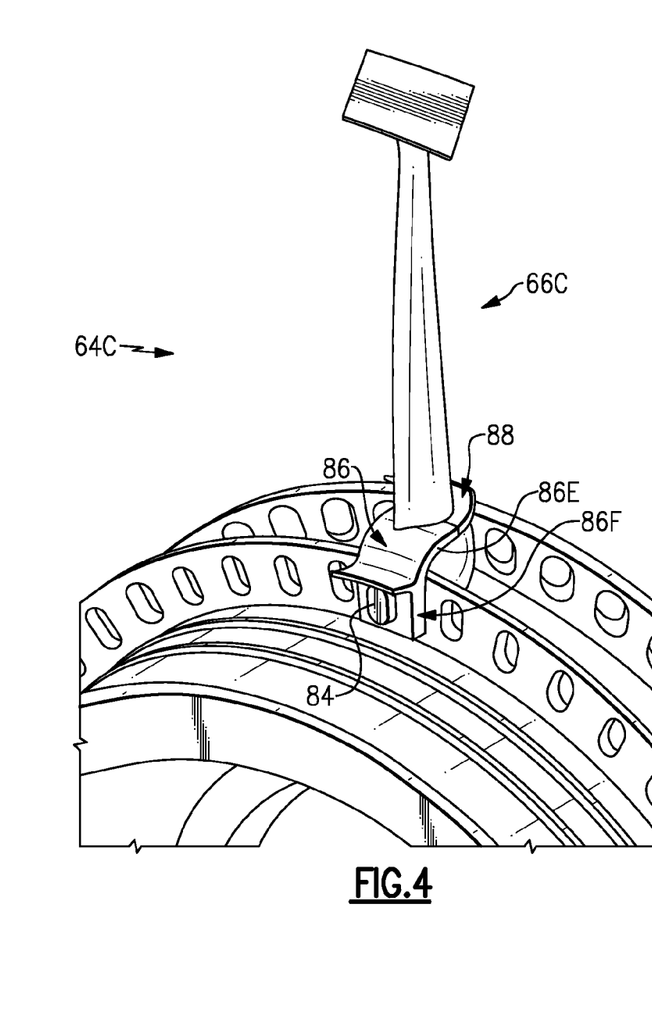
FIG. 4 is an assembled view of the hybrid CMC disk assembly.
Figure 5:
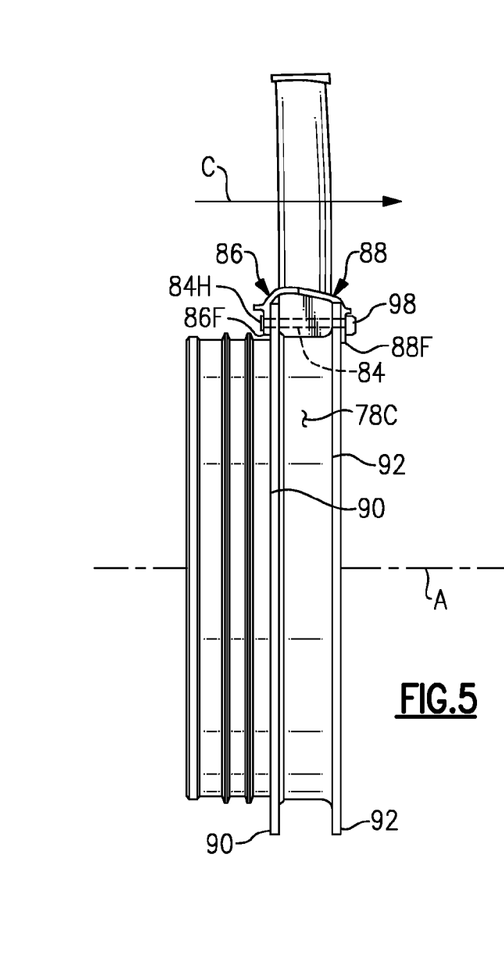
FIG. 5 is a side view of the hybrid CMC disk assembly.

The blade mount section 78C of the hub 68C defines a first radial flange 90 and a second radial flange 92 which receive a root section 66Cr of each of the multiple of airfoils 66C therebetween. Each of the first radial flange 90 and the second radial flange 92 define a respective multiple of apertures 90A, 92A which form paired sets that align and correspond with a bore 66CrB defined by the root section 66Cr of the airfoil 66C (FIG. 4). An aperture 86A, 88A within a flange 86F, 88F of each respective platform segment 86, 88 align with the associated aperture 90A, 92A. That is, each flange 86E, 86F, 88F of each respective platform segments 86, 88 at least partially encloses the first radial flange 90 and the second radial flange 92 such that the assembled platform segments 86, 88 define the inner core airflow gas path C (FIG. 5).

Figure 6:
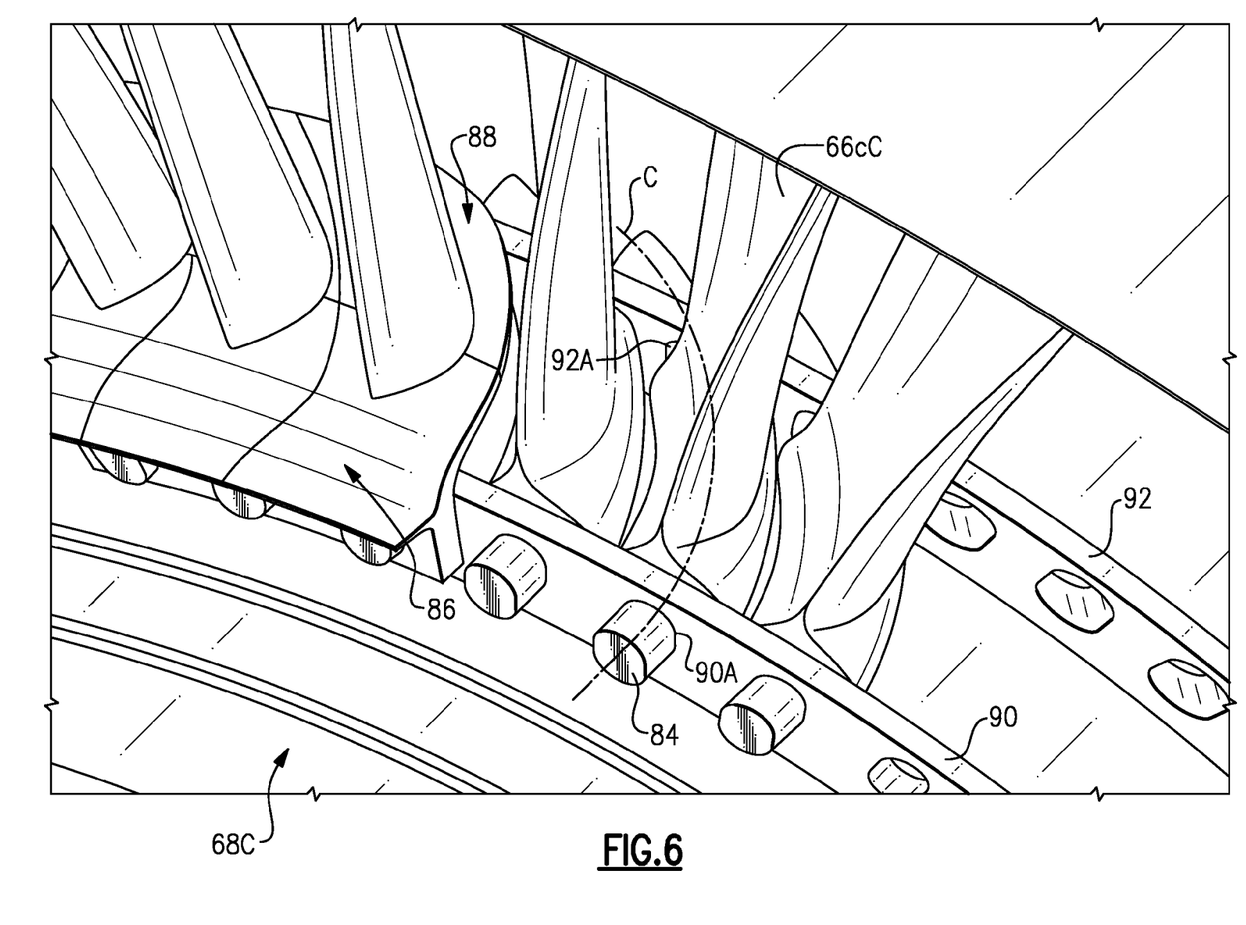
FIG. 6 is a top perspective view of the hybrid CMC disk assembly.

The apertures 86A, 88A, 90A, 92A, and bore 66CrB form a curved path defined by a non-linear axis C with respect to the engine longitudinal axis A about which hub 68C rotates. The airfoil pin 84 extends along the non-linear axis C such that the airfoil pin 84 is readily assembled along the curved path. The curved path, in one disclosed non-limiting embodiment, generally matches the chamber 66cC of the airfoil 66C such that centrifugal and aerodynamic forces pass radially through the pin 84 (FIG. 6).

The cross-sectional shape of the airfoil pin 84 matches the bore 66CrB. The bore 66CrB in the disclosed non-limiting embodiment is non-circular in cross-section to maximize engagement as well as prevent roll of the airfoil 66C. In the disclosed non-limiting embodiment, the airfoil pin 84 and the bore 66CrB is of a race track cross-sectional shape. The airfoil pin 84 is held in place along non-linear axis C with, for example, a head 84H on one end and a fastener 98 engaged with an opposite end. It should be understood that various alternate or additional retention systems may be provided.

Figure 7:
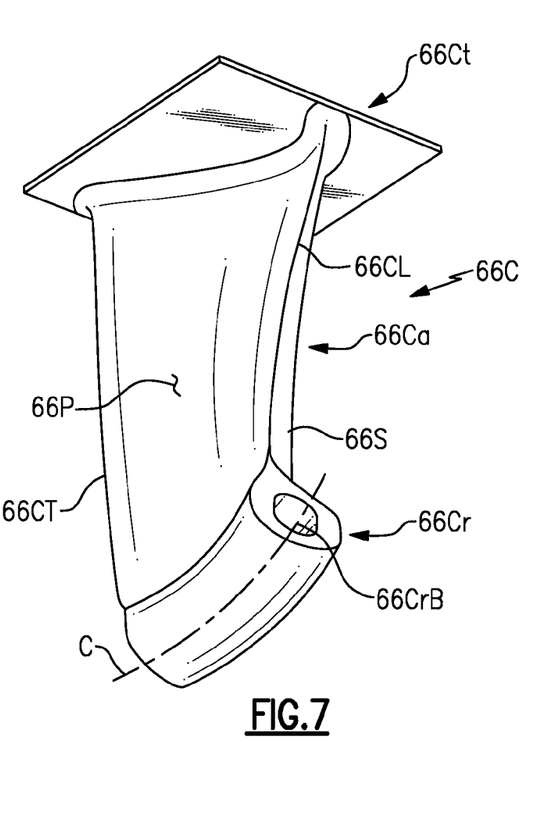
FIG. 7 is a perspective view of a CMC airfoil.

With reference to FIG. 7, each airfoil 66C generally includes a CMC root section 66Cr, a CMC airfoil section 66Ca and a CMC tip section 66Ct. It should be understood that although described with respect to discrete sections 66Cr, 66Ca, 66Ct, the airfoil 66C is essentially an integral CMC component formed from CMC ply layers which extend between the sections. The airfoil section 66Ca defines a generally concave shaped side which forms a pressure side 66P and a generally convex shaped side which forms a suction side 66S between a leading edge 66CL and a trailing edge 66CT.

Figure 8:
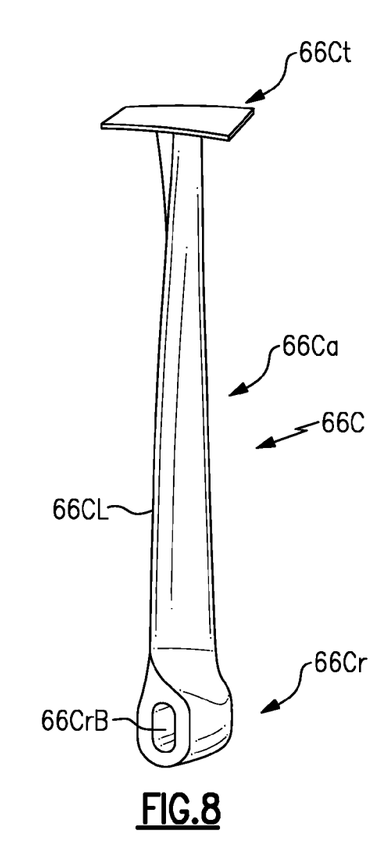
FIG. 8 is a front perspective view of the CMC airfoil.
Figure 9:
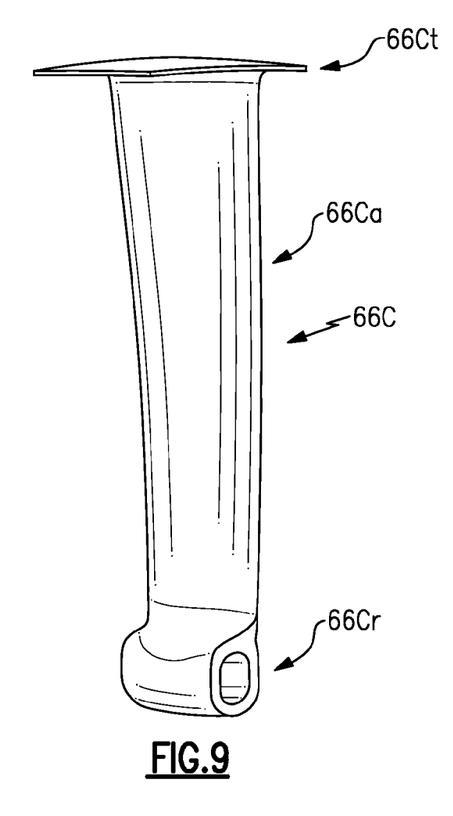
FIG. 9 is a side perspective view of the CMC airfoil.

The root section 66Cr defines the bore 66CrB along the non-linear axis C and blends into the airfoil section 66Ca. That is, the non-linear axis C defines a curve, bend, angle or other non-linear path which may generally follow the chamber of the airfoil section 66Ca (FIGS. 8 and 9). The bore 66CrB extends through the root section 66Cr generally between the leading edge 66CL and a trailing edge 66CT to attach the airfoil 66C to the hub 68C.

Figure 10:
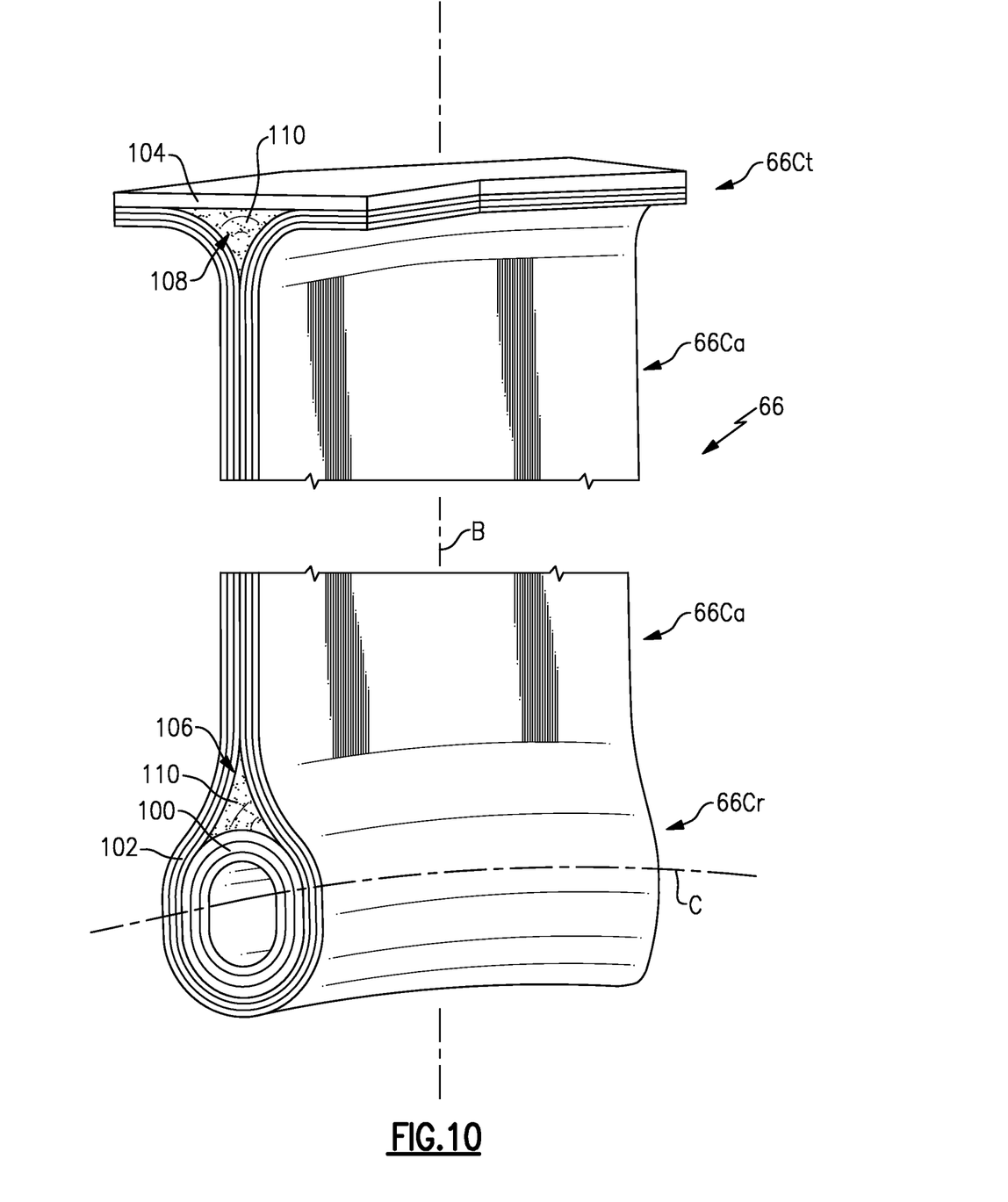
FIG. 10 is a ply arrangement of a CMC airfoil.

With reference to FIG. 10, the fabrication of the CMC airfoil 66 may be performed in several steps to form the various features. The root section 66Cr may be manufactured from a tube 100 of CMC material such that the tube 100 defines the bore 66CrB along the non-linear axis C. It should be understood that "tube" as defined herein includes, but is not limited to, a non-circular member in cross-section. Additional CMC plies 102 of CMC material wrap around the tube 100 then extend along an airfoil axis B to form the airfoil section 66Ca and the tip section 66Ct in an integral manner.

The tip section 66Ct may define a platform section which, when assembled adjacent to the multiple of airfoils 66C, defines an outer shroud. That is, the tip section 66Ct is includes a cap of CMC plies 104 which are generally transverse to the airfoil axis B. The cap of CMC plies 104 may alternatively or additionally include fabric plies to obtain thicker sections if required.

Triangular areas 106, 108 at which the multiple of CMC plies 102 separate to at least partially surround the tube 100 and separate to form the tip section 66Ct may be filled with a CMC filler material 110 such as chopped fiber and a tackifier. The CMC filler material 110 may additionally be utilized in areas where pockets or lack of material may exist without compromising structural integrity.

Figure 11:
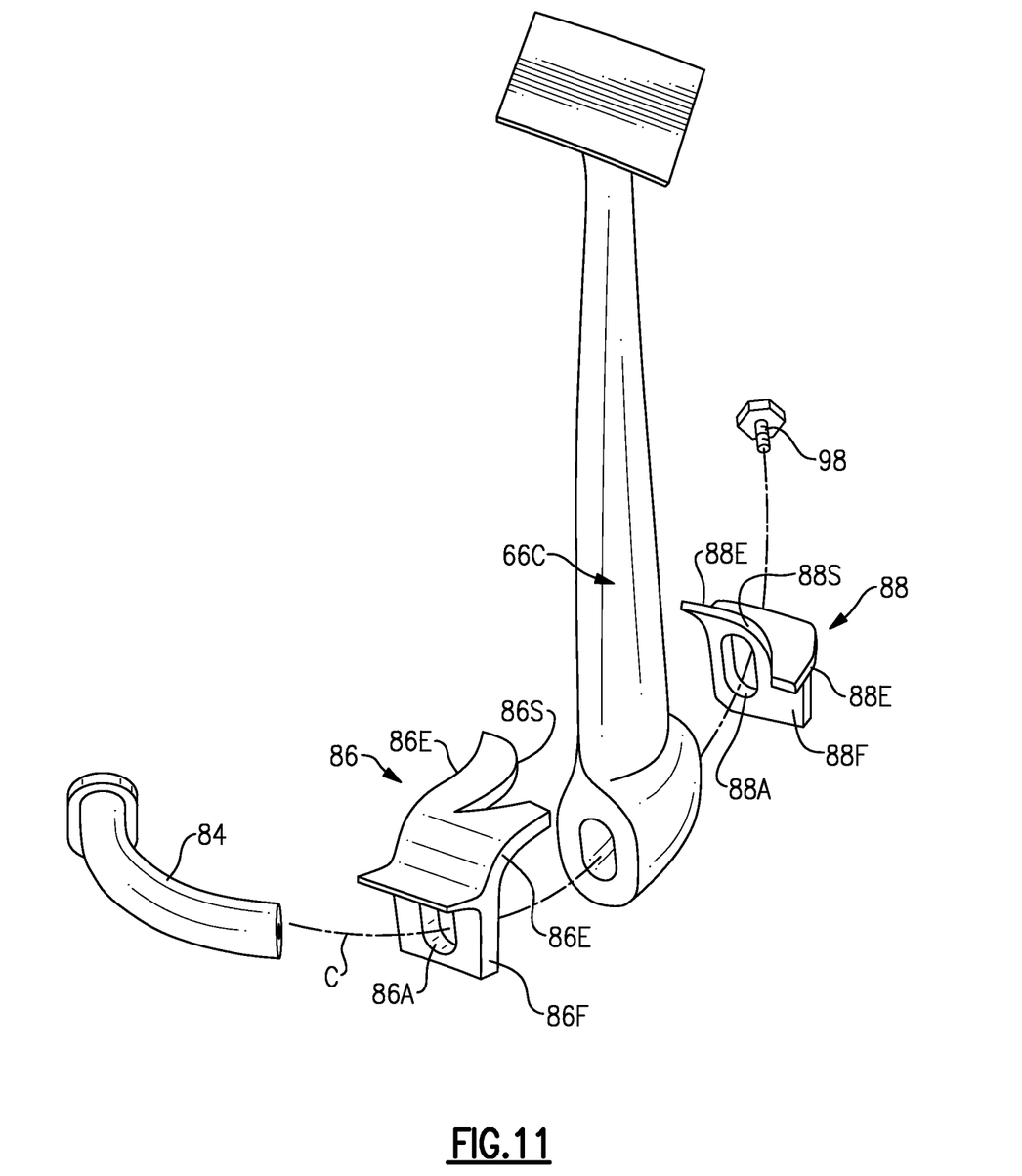
FIG. 11 is an exploded view of a CMC airfoil and CMC platform assembly.
Figure 12:
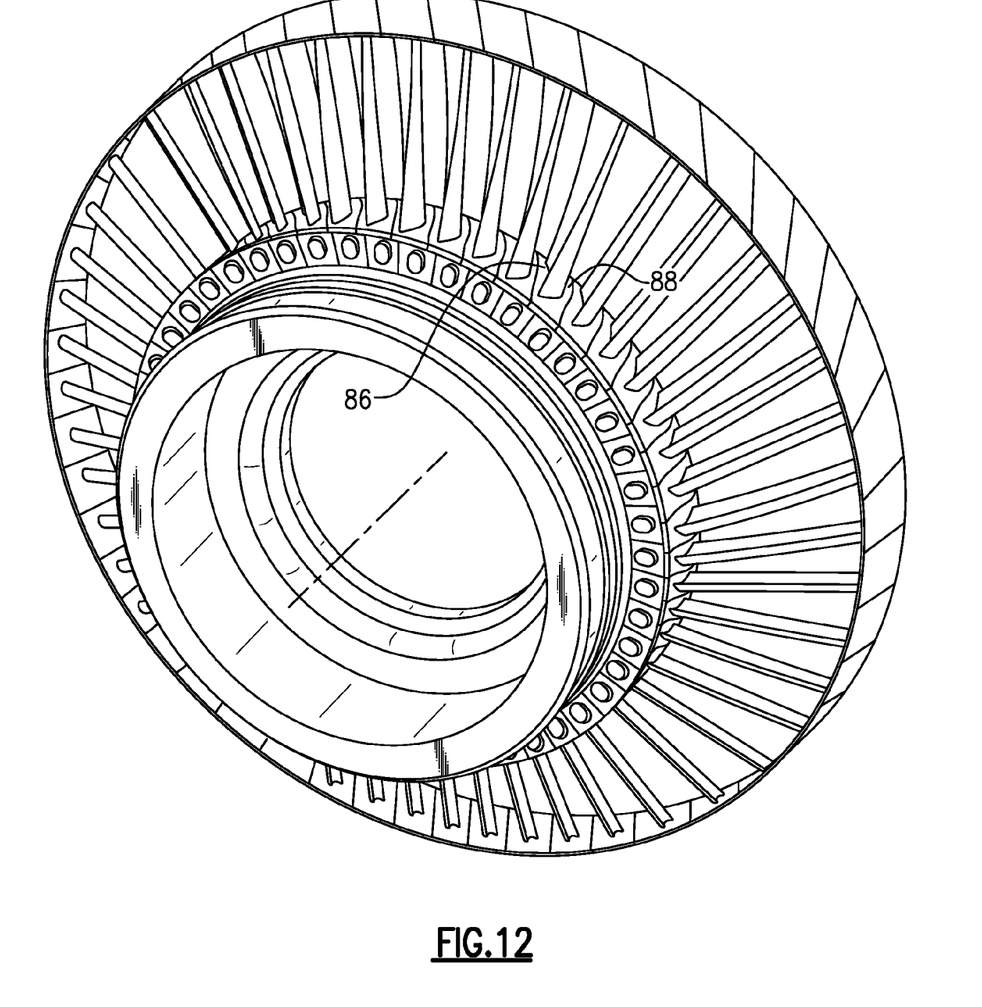
FIG. 12 is a perspective view of a hybrid CMC disk assembly which illustrates a single CMC airfoil and a platform assembly thereon.

With reference to FIG. 11, the forward platform segment 86 and the aft platform segment 88 are assembled with the airfoil pin 84 to provide a platform assembly (FIG. 12) that axially traps each of the airfoils 66C therebetween. A platform inner surface 86S, 88S of the respective platform segment 86, 88 defines an airfoil profile to fit closely around the surface of each airfoil 66C to thereby enclose the space between the first and second radial flange 90, 92 to prevent the entrance of core airflow (FIG. 12). The forward platform segment 86 and the aft platform segment 88 further define a contoured edge structure 86E, 88E such that each adjacent set of platform segments 86, 88 seal with the adjacent set of platform segments 86, 88 (FIG. 12). It should be understood that further redundant seal structures such as feather seals may alternatively or additionally be provided.

Figure 13:
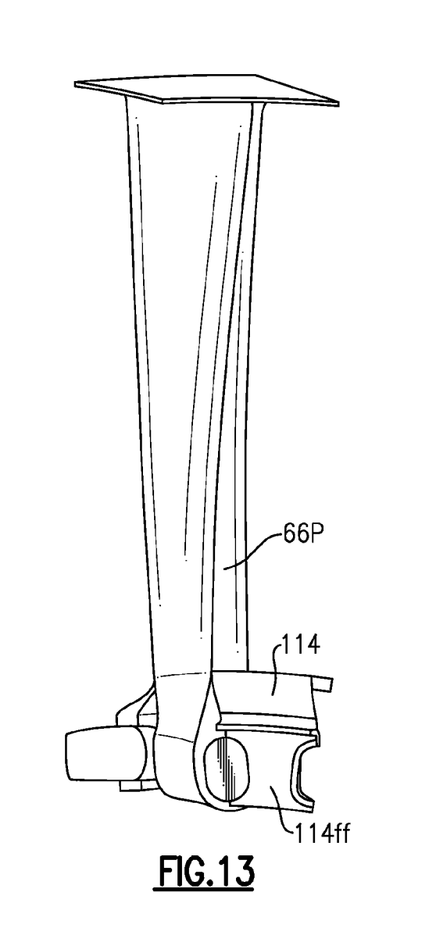
FIG. 13 is a front view of a CMC airfoil and CMC platform assembly.
Figure 14:
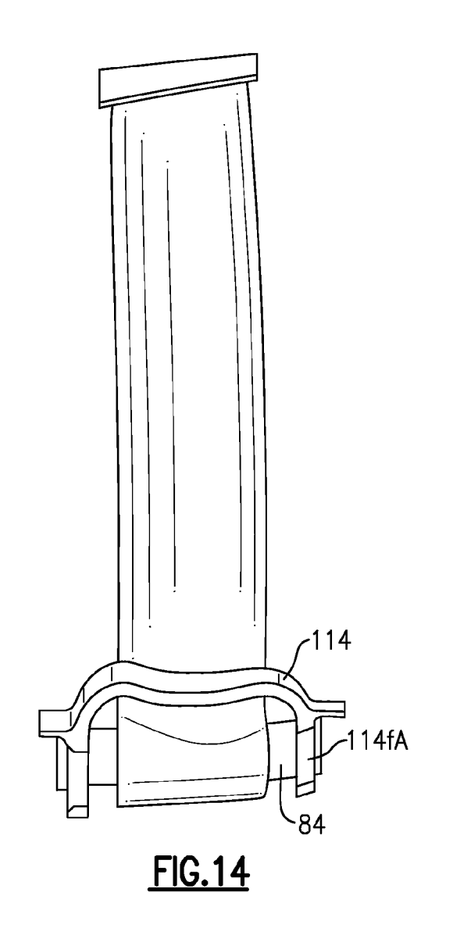
FIG. 14 is a side view of a CMC airfoil and CMC platform assembly.
Figure 15:
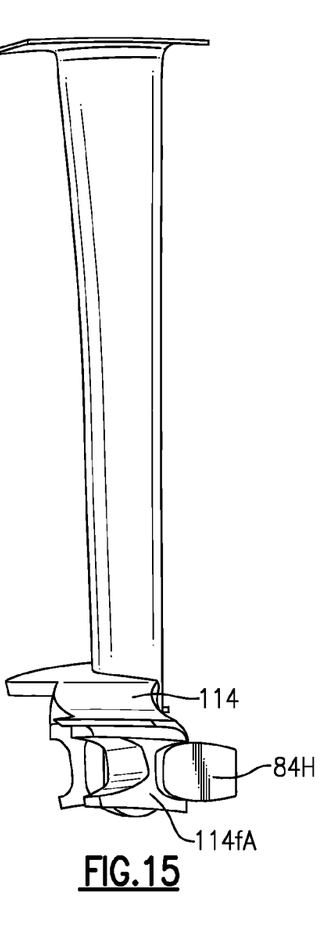
FIG. 15 is an aft view of a CMC airfoil and CMC platform assembly.
Figure 16:
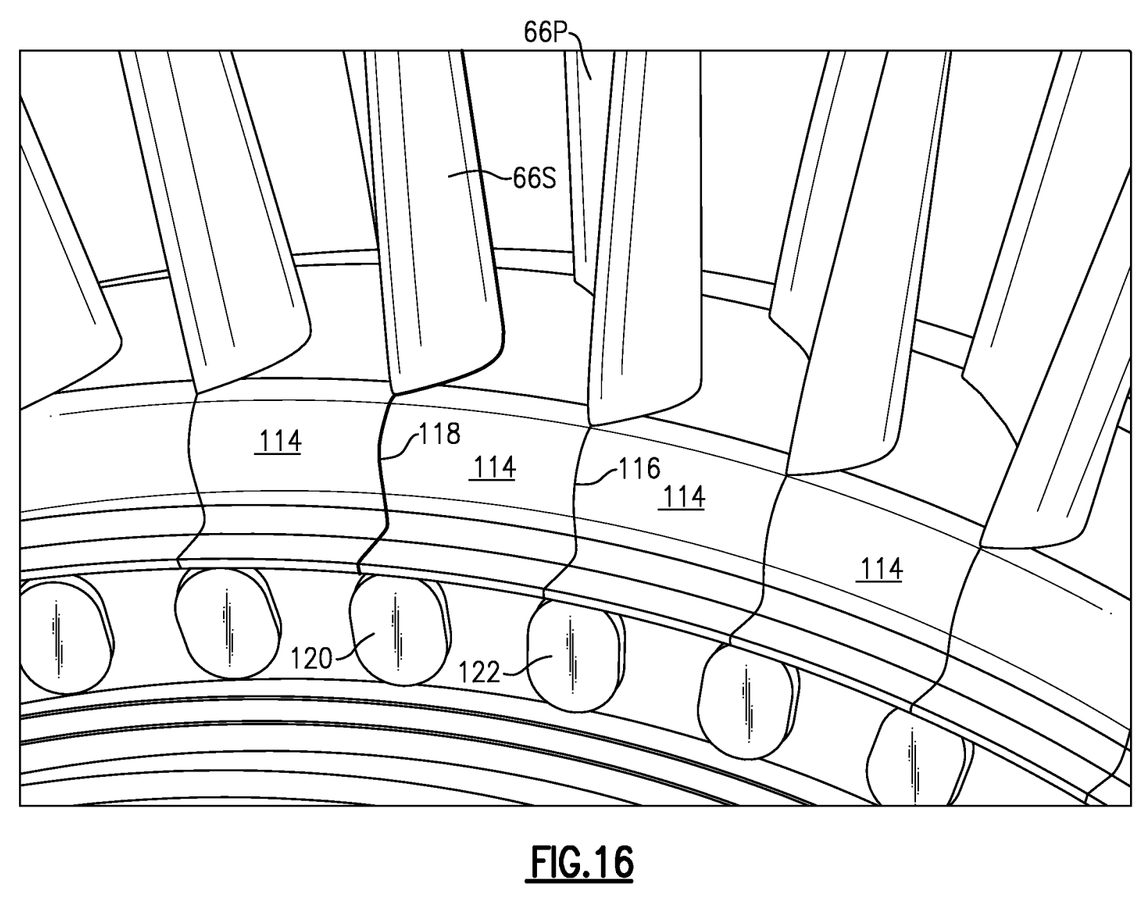
FIG. 16 is a perspective view of a CMC airfoil and a single CMC platform assembled to a disk.
Figure 17:
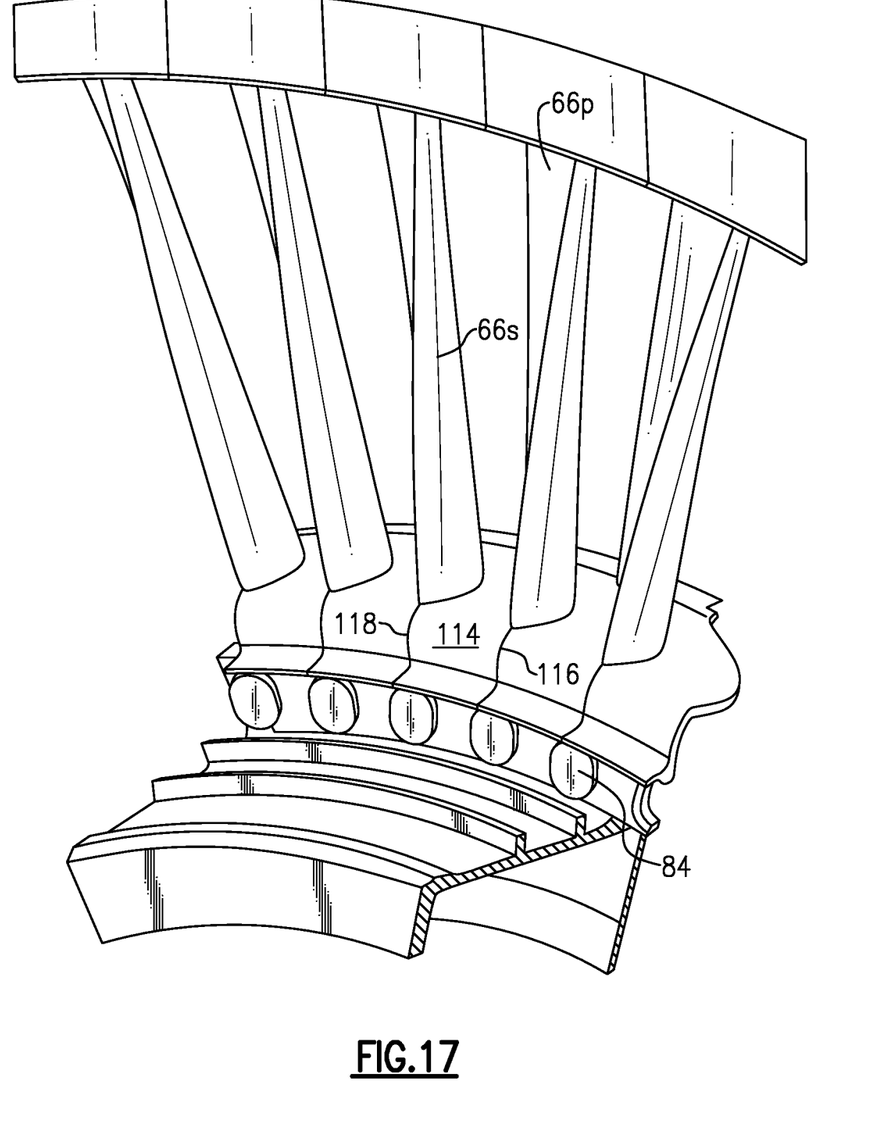
FIG. 17 is a perspective view of a section of a hybrid CMC disk assembly.

With reference to FIGS. 13-15, another non-limiting embodiment includes a platform 114 which is arranged to fit between each airfoil 66 (FIG. 16). The platform 114 includes a first edge surface 116 which abuts the pressure side 66P of one airfoil 66 and a second edge surface 118 which abuts a suction side 66S of an adjacent different airfoil 66 such that the multiple of platforms 114 enclose the space between the first and second radial flange 90, 92 (FIG. 16) to define the inner core airflow gas path (FIG. 17).

Each platform 114 further includes two partial apertures 120, 122 within a respective forward and aft flange 114FF, 114FA such that the platform 114 is trapped by two airfoil pins 84. That is, the head 84H of the airfoil pin 84 bridges adjacent platforms 114. The heads 84H may be located adjacent the aft flange 114FA of the platform 114.

Figure 18:
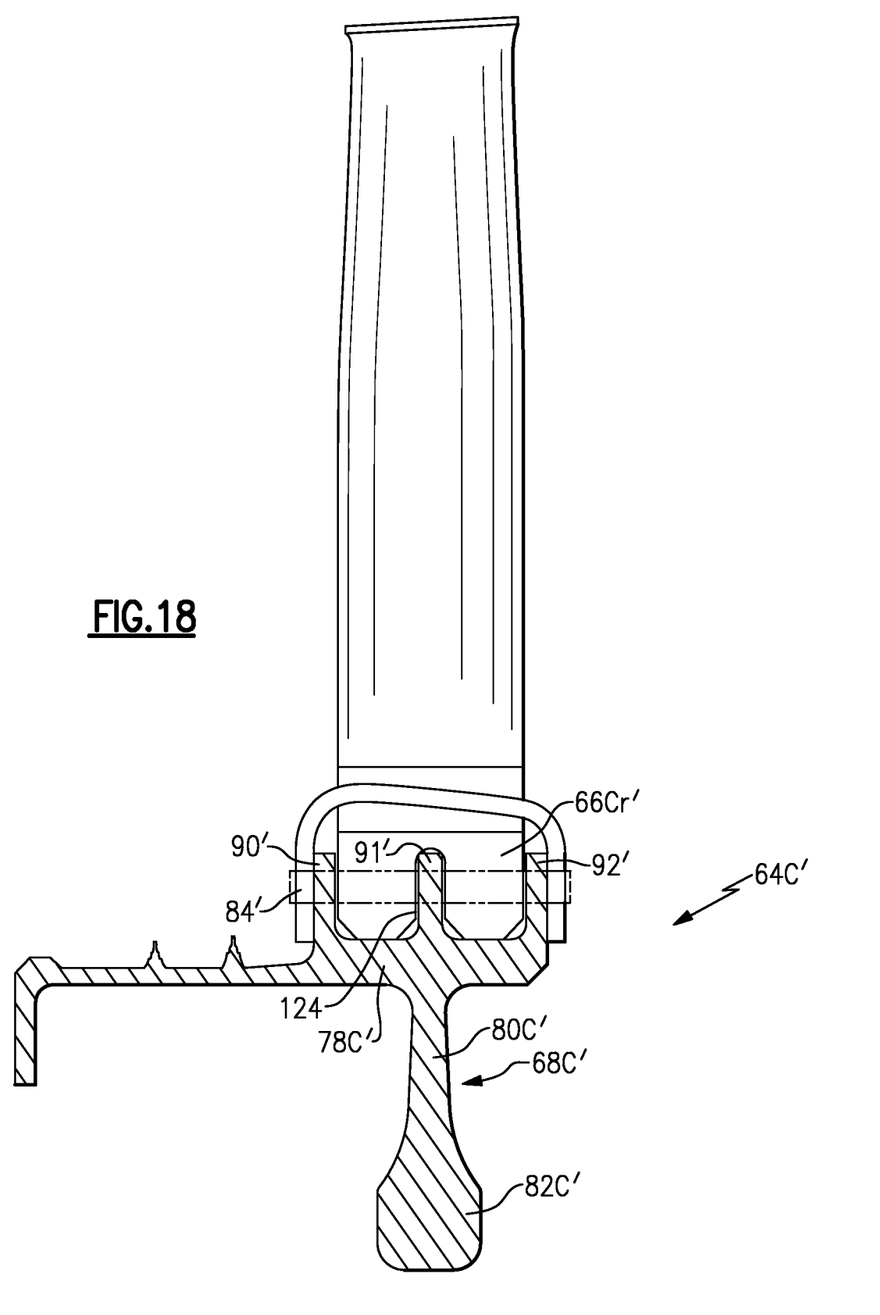
FIG. 18 is an alternate embodiment of a hybrid CMC disk assembly.

With reference to FIG. 18, another CMC disk assembly 64C' generally includes a hub 68C' having a first radial flange 90', a second radial flange 92' and a third radial flange 91' to define a blade mount section 78C'. The third radial flange 91' facilitates additional support for the airfoil pin 84'.

Figure 19:
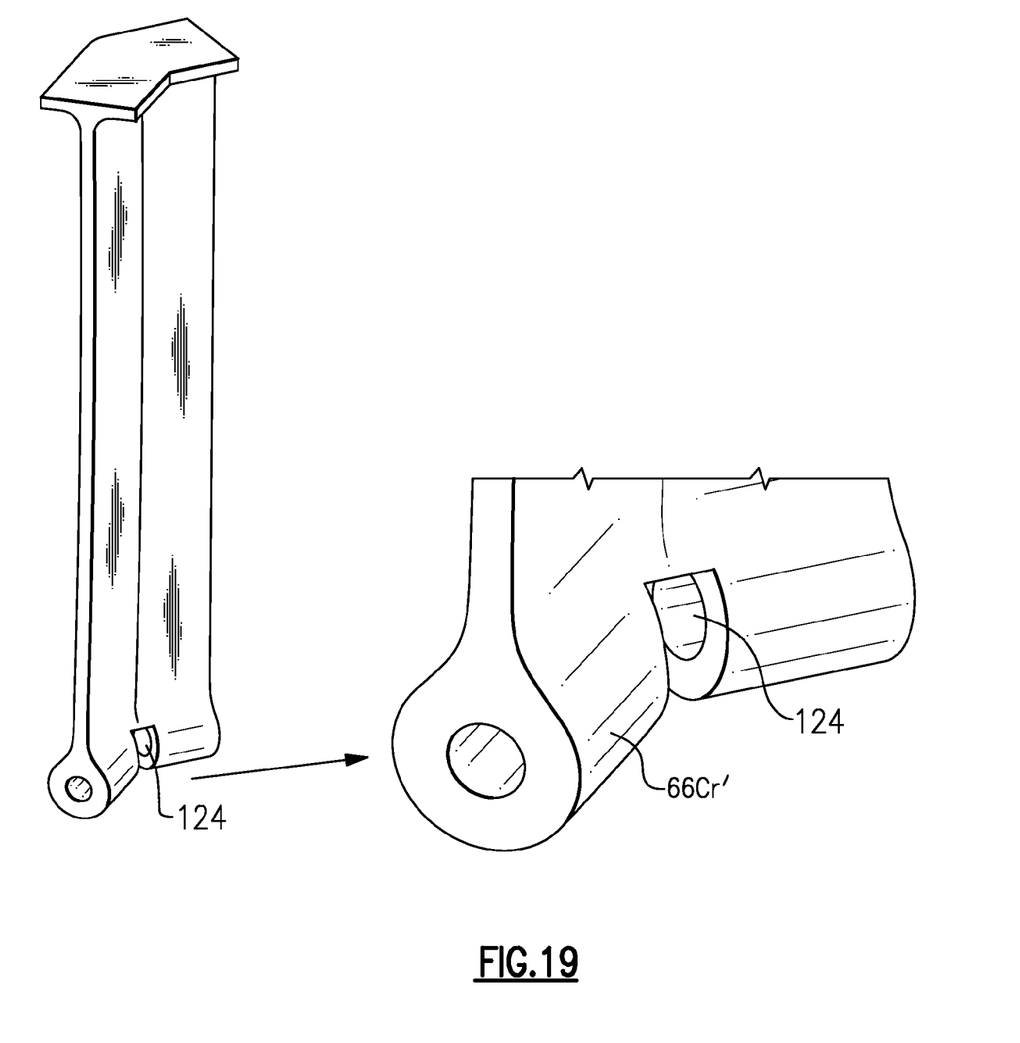
FIG. 19 is a perspective view of a CMC airfoil mountable to the hybrid CMC disk assembly of FIG. 18.

The hub 68C' generally includes the blade mount section 78C', a relatively thin disk section 80C' that extends radially inward from the blade mount section 78C' and an outwardly flared bore section 82C'. The third radial flange 91' in the disclosed non-limiting embodiment is located generally in line with the relatively thin disk section 80C' as well as a bend formed within the root section 66Cr'. The root section 66Cr' includes a slot 124 (also illustrated in FIG. 19) which receives the third radial flange 91'. The slot 124 also facilitates relief of any potential stress build up during CMC formation in the bend of the root section 66Cr'. It should be understood that the remainder of assembly is generally as described above.

The hybrid assembly defined by the use of metal alloys and CMC materials facilitates a lower weight configuration through the design integration of a CMC blade. The lower density of the material translates to a reduced rim pull which decreases the stress field and disk weight.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A Ceramic Matrix Composite (CMC) airfoil for a gas turbine engine comprising:
   a CMC root section which extends to form a CMC airfoil section;
   a forward platform segment and an aft platform segment capturing there between said CMC root section, said CMC root section, said forward platform segment, and said aft platform segment together defining a curved bore.

2. The Ceramic Matrix Composite (CMC) airfoil as recited in claim 1, wherein said curved bore is transverse to an axis defined by said CMC airfoil section.

3. The Ceramic Matrix Composite (CMC) airfoil as recited in claim 1, further comprising a CMC tip section which extends from said CMC airfoil section, said CMC tip section transverse to said CMC airfoil section.

4. The Ceramic Matrix Composite (CMC) airfoil as recited in claim 1, wherein said curved bore is defined by a tube of CMC plies.

5. The Ceramic Matrix Composite (CMC) airfoil as recited in claim 4, further comprising a multiple of CMC plies which extend at least partially around said tube and extend to at least partially define said CMC airfoil section.

6. The Ceramic Matrix Composite (CMC) airfoil as recited in claim 5, wherein said multiple of CMC plies define a generally triangular area adjacent to said tube.

7. The Ceramic Matrix Composite (CMC) airfoil as recited in claim 6, further comprising a CMC fabric filler material within said generally triangular area.

8. The Ceramic Matrix Composite (CMC) airfoil as recited in claim 4, wherein said tube is non-linear.

9. The Ceramic Matrix Composite (CMC) airfoil as recited in claim 8, wherein said tube generally follows a camber of said CMC airfoil section.

10. The Ceramic Matrix Composite (CMC) airfoil as recited in claim 1, wherein said CMC root section includes a slot transverse to said curved bore.

11. The Ceramic Matrix Composite (CMC) airfoil as recited in claim 1, further comprising a curved pin extending through said curved bore and securing said CMC root section, said forward platform segment, and said aft platform segment together.

12. The Ceramic Matrix Composite (CMC) airfoil as recited in claim 1, wherein said CMC root section is formed from a first multiple of CMC plies which define a tube and a second multiple of CMC plies which extend at least partially around said tube to at least partially define said CMC airfoil section, with a generally triangular area between said first multiple of CMC plies and said second multiple of CMC plies.

13. A Ceramic Matrix Composite (CMC) airfoil for a gas turbine engine comprising:
   a CMC root section which defines a bore, said bore formed from a first multiple of CMC plies which define a tube; and
   a second multiple of CMC plies which extend at least partially around said tube to at least partially define a CMC airfoil section, with a generally triangular area between said first multiple of CMC plies and said second multiple of CMC plies.

14. The Ceramic Matrix Composite (CMC) airfoil as recited in claim 13, wherein said bore is defined along a non-linear axis.

15. The Ceramic Matrix Composite (CMC) airfoil as recited in claim 13, further comprising a CMC fabric filler material within said generally triangular area.

16. The Ceramic Matrix Composite (CMC) airfoil as recited in claim 13, wherein said CMC root section includes a slot transverse to said bore.

17. The Ceramic Matrix Composite (CMC) airfoil as recited in claim 13, wherein said first multiple of CMC plies form a side of said generally triangular area and said second multiple of CMC plies form two other sides of said generally triangular area.

18. A rotor disk assembly for a gas turbine engine comprising:
   a hub defined about an axis of rotation, said hub includes a first radial flange having a multiple of first apertures and a second radial flange with a multiple of second apertures; and
   a multiple of CMC airfoils, each of said multiple of CMC airfoils having a CMC root section that defines a curved bore defined about a non-linear axis, said CMC root section located between said first radial flange and said second radial flange such that said curved bore is aligned with one of said multiple of first apertures and one of said multiple of second apertures; and
   a multiple of curved airfoil pins, each curved airfoil pin extending through a respective one of said curved bore and securing a respective one of said multiple of CMC airfoils to said hub.

19. The rotor disk assembly as recited in claim 18, wherein said disk assembly is a Low Pressure Turbine disk assembly.

20. The rotor disk assembly as recited in claim 18, wherein said disk assembly is a High Pressure Compressor disk assembly.

21. The rotor disk assembly as recited in claim 18, wherein each of said multiple of CMC airfoils includes a forward platform segment and an aft platform segment capturing there between said CMC root section, said CMC root section, said forward platform segment, and said aft platform segment together defining said curved bore.

22. The rotor disk assembly as recited in claim 21, wherein each said curved airfoil pin secures said CMC root section, said forward platform segment, and said aft platform segment together.

* * * * *